United States Patent [19]
Tokutomi et al.

[11] 4,313,657
[45] Feb. 2, 1982

[54] DISPLAY DEVICE FOR FOCUS DETECTING AND INDICATING DEVICE FOR CAMERA

[75] Inventors: Seijiro Tokutomi, Tokyo; Masao Jyojiki, Tsurugashima; Kazuo Nakamura, Shiki; Harumi Aoki, Kiyose, all of Japan

[73] Assignee: Asahi Kogaku Jogyo Kabushiki Kaisha, Tokyo, Japan

[21] Appl. No.: 113,888

[22] Filed: Jan. 21, 1980

[30] Foreign Application Priority Data

Feb. 15, 1979 [JP] Japan ............................. 54-18369[U]

[51] Int. Cl.³ .................... G03B 17/20; G03B 13/18
[52] U.S. Cl. .................................... 354/53; 354/198; 354/289; 354/60 L
[58] Field of Search ............ 354/25, 31, 53, 60 E, 354/60 L, 198, 289, 23 D, 54–57; 352/140, 170, 171

[56] References Cited

U.S. PATENT DOCUMENTS 4,047,187 9/1977 Mashimo et al. ................. 354/25 X
4,075,638 2/1978 Strauss et al. ..................... 354/53 X
4,114,995 9/1978 Stieringer et al. ................ 352/171
4,140,380 2/1979 Ueda et al. ........................ 354/53 X

*Primary Examiner*—L. T. Hix
*Assistant Examiner*—W. J. Brady
*Attorney, Agent, or Firm*—Sughrue, Mion, Zinn, Macpeak & Seas

[57] ABSTRACT

A display device for a camera in which both an electrical focus detecting and indicating device and an exposure meter or automatic exposure control device are incorporated into a single display element provided in the view finder of the camera. Switching means is coupled to receive on input contacts thereof signals representing both a focus indication and a shutter speed. Normally, the display device displays information in response to the focus detection and indication signal. When the shutter button of the camera is depressed to a first position, the switching means is changed over to display the shutter speed. The display device may be implemented either by an array of LED display elements or a liquid crystal display element.

2 Claims, 6 Drawing Figures

DISPLAY DEVICE FOR FOCUS DETECTING AND INDICATING DEVICE FOR CAMERA

BACKGROUND OF THE INVENTION

The present invention relates to display devices for a camera. More specifically, the invention relates to a display device for a camera having an electrical focus detecting and indicating device and an exposure meter or an automatic exposure control device.

In the past, exposure meters or automatic exposure control devices have been built into cameras. Recently, a variety of electrical focus detecting and indicating devices (hereinafter referred to as "focus indicating devices" when applicable) have been proposed as a new functional addition to cameras. In a focus indicating device, while the photographing lens is being adjusted to focus on an object to be photographed by adjusting the extension of the photographing lens, focalization and non-focalization are electrically detected to inform the photographer of whether or not the photographing lens is correctly focused on the object thereby facilitating the photographing operation.

Accordingly, it is necessary to provide a display device for the focus indicating device which indicates whether or not focalization has been obtained. For convenience in use, it goes without saying that the display device should be provided in the view finder. However, as a display device for exposure data has already been provided in the view finder, the additional provision of the display device for focus indication causes difficulties such as a reduction in the available space, an increase in manufacturing cost, and cluttering the view in the view finder.

In view of the foregoing, an object of the invention is to provide a display device for a camera having a focus indicating device and an exposure meter in which exposure indication and focus indication are displayed on a single display device in the view finder to thereby eliminate the above-described difficulties.

SUMMARY OF THE INVENTION

These, as well as other objects of the invention, may be met by a camera incorporating an electrical focus detecting and indicating device and an exposure metering or an automatic exposure control device including a display device, switching means having movable contacts coupled to an input signal port of the display device. The switching means is also coupled to receive at first and second stationary contacts thereof a focus detection and indication signal output and an exposure indication signal output, the switching means being operated by means for selecting one of the signals for controlling the display device. The terms "movable contact" and "stationary contact" are used herein generically. That is, the switching means of the invention is not limited to a mechanical switch device but can instead be an electronic switch having terminals which correspond and perform a similar function to the corresponding terminals of a mechanical switch device.

The switching means is normally set for the focus detection and indication signal outputs but is settable for the exposure indication signal output by an initial stroke of the shutter button of the camera. In a preferred embodiment, the display device may be a liquid crystal display element for displaying an exposure data indicating scale. In this embodiment, a change-over switch is provided which normally maintains the liquid crystal display element turned off but turns it on in association with the initial stroke of the shutter button of the camera. In another embodiment, the display device may be an array of LED elements.

BRIEF DESCRIPTION OF THE DRAWINGS

FIG. 5A shows LED dots in a focus indication mode and FIG. 5B shows the same LED dots in a shutter speed indication mode.

DESCRIPTION OF THE PREFERRED EMBODIMENTS

Figure 1:
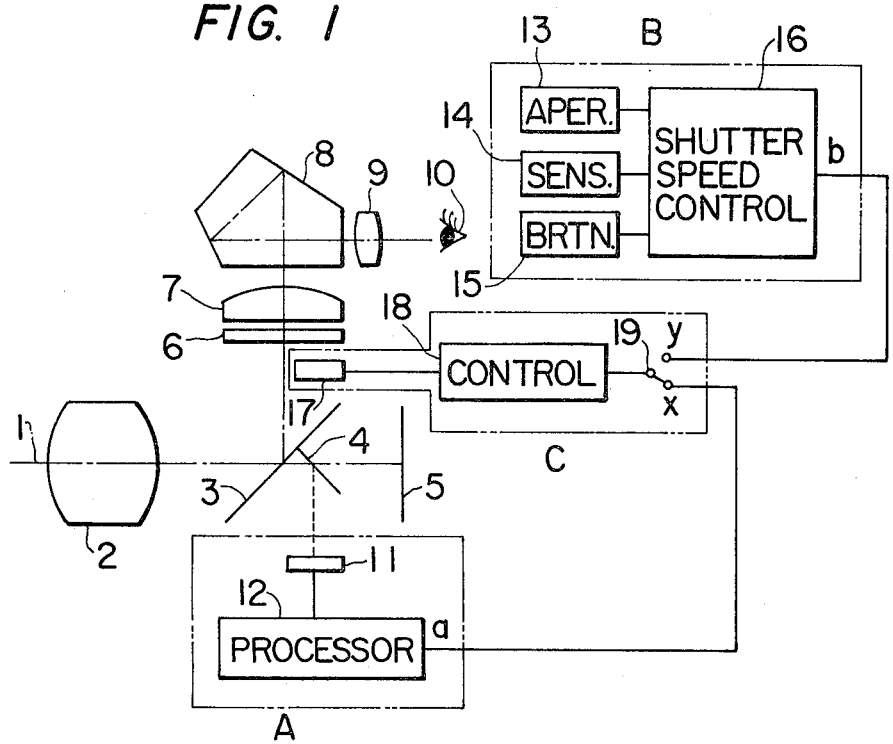
FIG. 1 is an explanatory diagram showing the arrangement of a single-lens reflex camera incorporating an aperture-priority type automatic exposure control device and a focus indicating device according to the invention.

The invention will be described with reference to a single-lens reflex camera with an aperture-priority type automatic exposure control device and a contrast detection type focus indicating device. In FIG. 1, reference numeral 1 designates an optical axis; 2, a photographing lens; 3, a half-silvered mirror; 4, a second mirror; 5, a film surface; 6, a focusing plate; 7, a condenser lens; 8, a penta-prism; 9, a magnifier; and 10, an eye of a photographer. All of these elements except the second mirror 4 form the optical system of an ordinary single-lens reflex camera. A block A is the detecting section of a contrast detection type focus indicating device while includes a sensor 11 and a processing circuit 12 with a contrast output terminal a.

A block B contains the aperture-priority type automatic exposure control circuit in which reference numeral 13 designates an aperture data input, 14, a film sensitivity data input, 15, an object brightness data input, and 16, a conventional shutter speed calculation and control circuit. The circuit 16 has an output terminal b at which an analog output corresponding to a calculated shutter speed is provided. A block C is a display device which includes an LED (light emitting diode) display element unit 17 with sixteen dots (LED's), a control circuit 18 for the LED unit 17, and a switch 19 for selectively applying to the control circuit 18 the outputs at the terminals a and b depending on shutter speed and focus indication to thereby cause the LED unit 17 to display the selected output.

Figure 3:
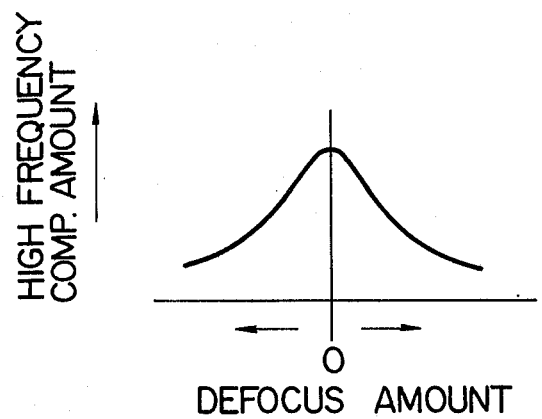
FIG. 3 is a graphical representation indicating the relation between the amount of defocus and the amount of high frequency component of an image.

Before the operation of the circuitry shown in FIG. 1 is described the operation of the contrast detection type focus indicating device will be explained. The relation between the distance between the plane of an image at the time of non-focalization and the plane of the image at the time of focalization, in other words, the amount of defocus, and the amount of high frequency components in the spatial frequency spectrum of the image can be represented by a symmetrical characteristic curve having a single peak as shown in FIG. 3. It is known in the art that, as the amount of defocus increases, the amount of high frequency components correspondingly increases. Accordingly, when the maximum value is obtained while detecting high frequency components of an image plane at various positions, the position of the image plane is then at the focused position.

Figure 4:
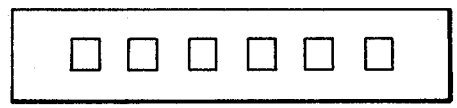
FIG. 4 is a plan view showing an array of light receiving elements.

In one conventional technique for detecting the amount of high frequency components, an array of light receiving elements arranged along a line as shown in FIG. 4, having uniform photoelectric characteristic is disposed in a plane parallel to the image plane and the sum of differences between the outputs of adjacent light receiving elements is calculated. This sum represents a contrast detection output. Variations of the contrast detection output are applied to a display device. Accordingly, the photographer can detect focalization by observing the maximum indication value on the display device.

Referring back to FIG. 1, the sensor 11 is implemented as the array of light receiving elements described above with its light receiving surface at a position equivalent to the position of the film surface 5. Light from the photographing lens is applied through the half-silvered mirror 3 and the second mirror 4 to the light receiving surface. The processing circuit 12 receives the output of the sensor 11 and processes it as described above as a result of which a contrast output is provided at its terminal a. The automatic exposure control circuit, block B, processes the photographing data inputs 13, 14 and 15 to provide a shutter speed indicating analog output at the terminal b.

Figure 2:
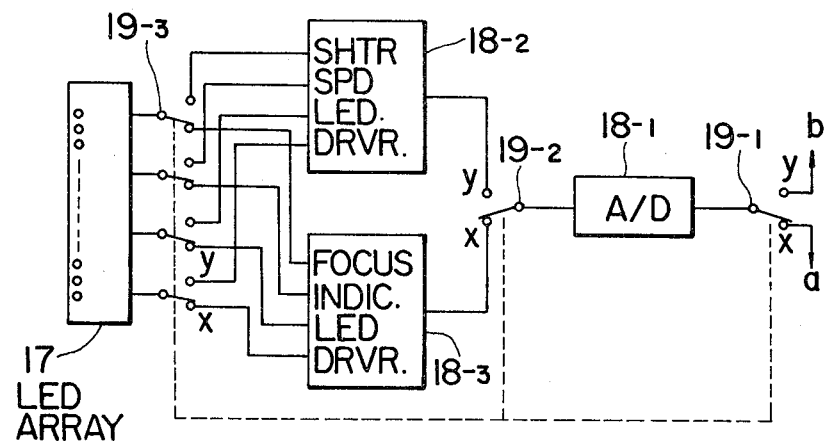
FIG. 2 is a block diagram showing a block C in FIG. 1 in more detail.

The thus obtained focus indicating output and shutter speed indicating output are displayed by the indicating device, block C, as follows. FIG. 2 shows the arrangement of the block C in more detail. In FIG. 2, reference numeral 17 designates a 16-dot LED array having 4-bit input terminals; 18-1, an analog-to-digital (A/D) converter circuit; 18-2, a shutter speed LED driver including a logic circuit which is capable of individually activating each dot or each LED corresponding to outputs from the A/D converter circuit 18-1; 18-3, a focus indicating LED driver having a logic circuit which similarly controls dots corresponding to an output of the A/D converter circuit 18-1; 19-1, a switch for selectively applying inputs to the A/D converter circuit 18-1; 19-2, a switch for selectively applying the output of the A/D converter circuit 18-1 to the LED driver 18-2 or 18-3; and 19-3, a 4-pole switch for selectively applying the outputs of the LED drivers 18-2 and 18-3 to the LED array 17.

The switches 19-1, 19-2 and 19-3 may be operated simultaneously or in association with one another. Normally, the movable contacts of each of these switches are set to the stationary contacts x so that focus indication is effected by the LED array 17. When the movable contacts are changed over to the contacts y, shutter speed is indicated by the LED array 17. The switches are preferably so designed that they are operated by the shutter button (not shown).

Figure 5A:
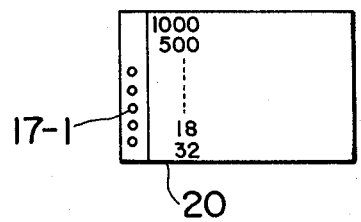
FIGS. 5A and 5B show the view finder of the single-lens reflex camera shown in FIG. 1.
Figure 5B:
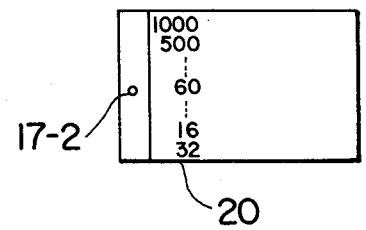

The operation of the display device will be described. FIGS. 5A and 5B show a view finder. In FIGS. 5A and 5B, reference numerals 17-1 and 17-2 designate LED dots which are illuminated and 20, a shutter speed scale. In FIG. 5A, the movable contacts of the switches 19-1 through 19-3 are set at the contacts x and focus indication is effected. The operator can then focus the lens on an object by adjusting the extension of the lens so that as many LED dots 17-1 as possible are turned on.

When the shutter button is slightly depressed, the movable contacts of the switches 19-1 through 19-3 are changed over to the contacts y and an LED dot is turned on as shown in FIG. 5B. Therefore, the photographer can determine the shutter speed from a mark on the shutter speed scale. For example, when illuminated, the LED dot 17-2 indicates a shutter speed of 1/60 sec.

In the example described, the shutter speed and focus indications are switched by a group of switches which are operated in association with the shutter button. However, the invention is not limited thereby or thereto. For instance, the switching operation can be achieved by providing a separate device for operating the group of switches at a desired position on the outside of the camera. Furthermore, the shutter speed and focus indications may be switched according to a system in which switching is effected whenever the switching member is operated or with a system in which normally exposure data is indicated but focus indication is displayed by switching operation or with a system in which the indications are switched by the utilization of a timer.

In addition, the indicating device can be so designed that the shutter speed scale 20 appears only when the movable contacts of the switches 19-1 through 19-3 are moved to the contacts y. In this case, the indication in the view finder have an improved appearance. For instance, the indicating device can be so designed that an electronic optical indication element such as a liquid crystal is used as the scale 20 in such a manner that it is operated when the movable contacts of the group of switches 19 are moved to the contacts y.

As is apparent from the above description, according to the invention, the focus indication and the exposure indication are effected by one device. Therefore, a camera having both an exposure meter or an automatic exposure control device and a focus indicating device is provided according to the invention which, even through the focus indicator is incorporated therein, it is nevertheless free from problems such as an increase in size, an increase in manufacturing cost and cluttering of the view finder.

What is claimed is:
1. In a camera incorporating an electrical focus detecting and indicating device and an exposure metering or an automatic exposure control device comprising:
   a display device comprising; an array of LED elements and driving means for operating said array of LED elements, a liquid crystal display scale for displaying an exposure data indicating scale, and a change-over switch which normally maintains said liquid crystal display element turned off so that it cannot be seen by the camera operator and turns on said liquid crystal display scale in response to the initial stroke of the shutter button of said camera so that said scale can be seen by the camera operator,
   switching means having movable contacts coupled to an input signal port of said display device, said switching means being coupled to receive at first and second stationary contacts respectively a focus detection indication signal output and an exposure indication signal output, said switching means being normally set for connecting said focus detection indicating signal output to said display device to cause said array of LED elements to display a visible indication of said focus detection indicating output signal, and
   said switching means being responsive to the initial stroke of said shutter button to cause said array of LED elements in conjunction with said liquid crys- tal display scale to display a visual indication of said exposure indicating signal output.

2. The display device as claimed in claim 1 wherein said driving means comprises shutter speed LED driver circuitry connected to said LED array for causing said array to provide visual illumination adjacent the designation on said liquid crystal display scale corresponding to the value of said exposure indicating signal output, and focus indication LED driver circuitry connected to said LED array for causing said array to indicate the focus condition of said camera by the length of line illuminated on said LED array.

* * * * *